United States Patent [19]

Miyanishi et al.

[11] 3,809,201
[45] May 7, 1974

[54] MODULATING VALVE FOR VEHICLE TRANSMISSION SYSTEMS

[75] Inventors: Noritake Miyanishi; Shigeru Kubota, both of Ogaki; Hirotoshi Baba; Masahiro Takahashi, both of Akashi, all of Japan

[73] Assignees: Kobe Steel, Ltd., Kobe; Shinko Engineering Co., Ltd., Ogaki-city, both of, Japan

[22] Filed: Oct. 30, 1972

[21] Appl. No.: 301,950

[30] Foreign Application Priority Data
Oct. 30, 1970 Japan.................................. 45-86504

[52] U.S. Cl. ......... 192/109 F, 192/109 D, 251/63.4, 137/625.49
[51] Int. Cl. .................... F16k 31/163, F16k 31/363
[58] Field of Search ............. 192/109 F, 109 D, 52; 251/63.4, 77; 137/625.48, 625.49; 92/65

[56] References Cited
UNITED STATES PATENTS
1,373,599 4/1921 Clark ........................... 251/63.4 X
3,715,017 2/1973 Jenny ......................... 192/109 F X
3,501,979 3/1970 Forster et al. ............... 192/109 F X Primary Examiner—Samuel Scott
Assistant Examiner—Lance W. Chandler
Attorney, Agent, or Firm—Oblon, Fisher, Spivak, McClelland & Maier

[57] ABSTRACT

A modulating valve capable of shortening the operating time of the clutch and also preventing the generation of an impulsive torque in the clutch-transmitted power by discontinuously changing the rate of variation of pressure used for pressing together the frictional members of the friction clutch. In order that the force, acting upon the valve body of the pressure regulating valve, will vary discontinuously relative to time, a plurality of independently slidable pistons are provided so that a discontinuously varying force will be generated by the strokes of these pistons. Thus, according to this arrangement, pressure, varying with the time in a manner that is not readily achievable with conventional systems, can be used for pressing together the frictional members, thereby realizing an operation with reduced working time and which is free of impulsive torque.

4 Claims, 6 Drawing Figures

MODULATING VALVE FOR VEHICLE TRANSMISSION SYSTEMS

BACKGROUND OF THE INVENTION

The present invention relates generally to valves and more particularly to an improved modulating valve for providing a variable pressure for use in a friction clutch.

In a power transmission gearing system whereby the power for driving a vehicle or the like is transmitted intermittently or altered so as to change speed ratios, the stationary friction member and the rotating friction member of a friction clutch are pressed together against each other upon commencement of the power transmission operation so that if the period of engagement between the friction members, which lasts from the moment of contact between friction members till completion of the power transmission operation, is shortened, a momentary impulsive torque is inevitably produced owing to the inertia force of the rotating elements, such torque consequently effecting an adverse effect upon the strength of the power transmission system as well as upon the driving operation of the vehicle.

In order to overcome such adverse effects, there has been developed a so-called modulating valve which is automatically operated so as to adjust the rate of change in the oil pressure for pressing together the friction members to a suitable level which will allow smooth engagement of the friction members. Needless to say, smooth engagement can be obtained if the rate of change in the oil pressure is reduced. However, if it is attempted to obtain smooth engagement by using such a known type of modulating valve, the period of engagement, which lasts from the moment of contact between the two friction members till completion of power transmission, is necessarily elongated, resulting in deteriorated responsiveness in the driving operation.

There is also known an improved modulating valve which has eliminated the aforementioned defect, such as, for example, that valve disclosed within U.S. Pat. No. 3,389,770 which proposes a pressure control device designed to discontinuously and gradually increase the rate of change in the oil pressure for pressing together the friction members so as to thereby allow smooth engagement of the members such being accomplished within a short period of time. According to this device, a plurality of cylindrical pressure regulating springs, of different spring constants, are provided in series between one end of the pressure regulating valve and the bottom portion of the valve box, with a seating ring being interposed between each pair of adjoining springs, thereby regulating the movement of the pressure regulating valve.

This device, however, is structurally complex, and in addition, the period of engagement tends to vary widely owing to errors within the spring constants. Furthermore, when it is employed within a friction clutch, extreme difficulty is experienced in making adjustments thereto, and moreover, since it is inevitably required to provide more than two springs, a pressure regulating valve, and a valve box in series with each other, a large housing is necessitated for the device.

SUMMARY OF THE INVENTION

Accordingly, it is an object of the present invention to provide an improved modulating valve which is free of the aforementioned defects.

Another object of the present invention is to provide an improved modulating valve which is small and simple in construction.

Still another object of the present invention is to provide an improved modulating valve which permits a correct and accurate determination of the period of engagement of the frictional members.

Yet another object of the present invention is to provide an improved modulating valve which will produce a discontinuous change in the rate of variation of fluid pressure so as not to induce an implusive torque and which may accomplish the power transmission operation within a short period of time.

It is a further object of the present invention to provide an improved modulating valve in which any possible pattern of variation of fluid pressure may easily be accomplished and wherein adjustment of a pattern may simply be made.

The foregoing objectives are achieved according to this invention through the provision of an improved modulating valve comprising a slidable pressure control valve adapted to regulate the oil pressure for pressing together the friction members by means of a force applied to the rear surface thereof. To the rear of the pressure control valve there are provided a plurality of pistons arranged to be slidable independently of each other, by a supply of oil which is permitted to flow through an orifice from an oil pressure source and circuit controlled by the control valve, with elastic elements being interposed between the pressure control valve and the pistons, wherein at least one of the pistons is arranged to contact stopper means during the course of its movement so that extraneous forces will not be produced due to the springs regardless of the sliding movement of the remaining pistons. The pressure used for pressing together the friction members is controlled by the force applied to the valve body of the pressure control valve through the spring means, so that it is necessary to impart to the valve body a force that varies discontinuously with time. To accomplish this, the rear portion of the valve body is utilized as the stopper means, and in addition, one piston, which contacts the stopper means, is positioned such that it passes through the remaining pistons. The pistons thus provide the force acting upon the pressure control valve, and the piston which contacts the stopper means does so during the sliding movement of all the pistons. In this manner, the effective area of the pressure control valve is substantially changed during the course of varying the pressure by means of changing the force applied to the rear surface of the valve. Since the oil pressure acting upon the pistons is substantially equal to the oil pressure effected by the pressure control valve, that portion of the effective area of the control valve which is occupied by one of the pistons, as compared to the entire effective area of the pressure control valve which has previously been the basis for controlling the oil pressure, is made ineffective, and hence there results an oil pressure variation wherein both the rate of variation, as well as the pressure itself, are discontinuous as compared with the oil pressure variation prior to contact of one of the pistons and the rear portion, or stopper means, of the control valve. The time adjustment of the transmission operation of course can be controlled by the flow rate of the oil through the lines and the orifices leading to the pistons and valve.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
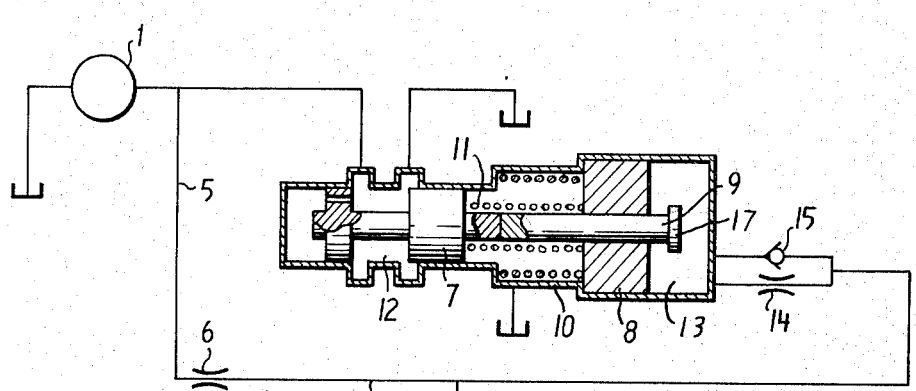
FIG. 1 is a schematic view of one embodiment of the modulating valve and the associated friction clutch system, showing the valve in its operative position so as to attain the final pressure needed for power transmission.

Referring now to the drawings, and more particularly to FIG. 1 thereof, there is shown a modulating valve system comprising a hydraulic pump 1, a pair of friction clutches 2 and 3, and a changeover valve 4 connecting clutches 2 and 3 with pump 1. The friction clutches 2 and 3 are provided with a mechanism, not shown, for pressing the friction members together with a force having a magnitude corresponding to the oil pressure within the hydraulic system. Consequently, if the friction clutch 2 is adapted for the forward driving system and the friction clutch 3 is adapted for the rearward driving system, the forward movement, rearward movement, and stoppage of the system can be selectively attained in accordance with the appropriate operation of the changeover valve 4. A hydraulic line 5 connects the hydraulic pump 1 with the changeover valve 4 by means of a variable orifice 6 which is thus adapted to adjust the flow rate.

The pressure regulating mechanism for adjusting the oil pressure between the hydraulic pump 1 and the orifice 6, so as to thereby control operation of friction clutches 2 and 3 comprises a valve body 7, a first annular piston 8, a second, substantially cylindrical piston 9 slidably movable within piston 8, a first coil spring 10 for biasing piston 8, a second coil spring 11 disposed about piston 9, a first oil chamber 12 operatively associated with body 7, and a second oil chamber 13 operatively associated with pistons 8 and 9. The first and second pistons 8 and 9, respectively, are reciprocated according to the oil pressure existing within the second oil chamber 13, which receives a supply of oil which has been conveyed through orifice 6, a hydraulic line 16, a variable orifice 14 and a check valve 15. The valve body 7 is actuated by the first and second pistons 8 and 9 respectively, either by means of springs 10 and 11 respectively, or by means of direct contact between the pistons and the valve body 7 without intermediate spring means, in which case, the rear portion of valve body 7 would serve as a stopper means for the second piston 9, whereby the pressure exerted upon body 7 would be transmitted to the fluid within the first oil chamber 12, which, in turn, would be the existing pressure within hydrualic line 5 between the hydraulic pump 1 and orifice 6. The second piston 9 is provided at its rear end with a cylindrical flanged portion 17 which is designed to abut the rear surface of piston 8 so as to transmit its movement to the first piston 8 within a predetermined range of movement.

Figure 2:
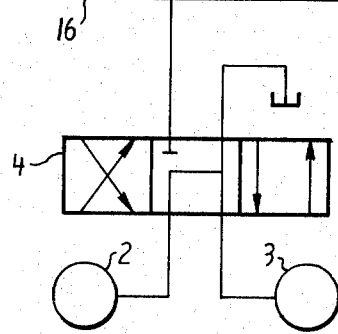
FIG. 2 is a partial view similar to that of FIG. 1 showing the valve in its operative position at the start of the power transmission.
Figure 3:
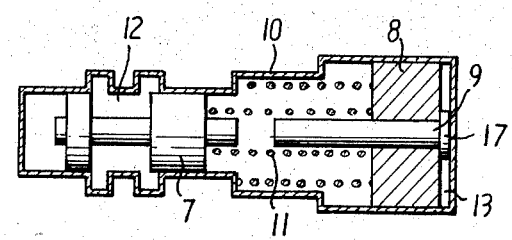
FIG. 3 is a partial view similar to that of FIGS. 1 and 2 showing the valve in its operative position as the pressure is increasing.
Figure 4:
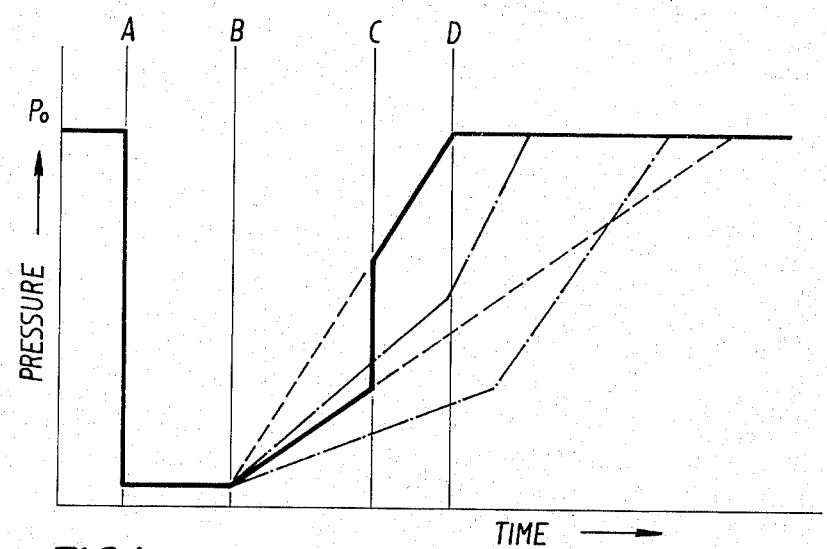
FIG. 4 is a graph showing the variation in oil pressure, as a function of time, generated within the friction clutch members, the solid lines depicting the variation in oil pressure when utilizing the embodiment of FIGS. 1–3 of the present invention, whereas the broken or chain lines depict the variation in oil pressure utilizing conventional systems.

The operations of the system are time-dependent, with particular emphasis being placed upon that period of time immediately subsequent to changeover. Referring to FIG. 4, there is shown in solid lines, a variable pattern of oil pressure, generated within the friction clutches 2 and 3, over a period of time. When the changeover valve 4 is actuated so that high-pressure oil flows into the friction clutches 2 and 3, oil pressure within the line 16 connecting the orifice 6 with the changeover valve 4 decreases temporarily. During this period, the first and second pistons 8 and 9 are in the positions as shown in FIG. 2, whereby the force transmitted by the second piston 9 to the valve body 7 is small, and hence, the pressure existing within the line 5 and the friction clutches 2 and 3 is also low. This situation is represented by lines A–B as shown in FIG. 4. With a lapse of time however, oil is passed through the orifices 6 and 14, and into the second oil chamber 13 so as to gradually move the first and second pistons 8 and 9 toward the valve body 7, whereby the force exerted by the first and second pistons 8 and 9 upon the valve body 7 gradually increases so as to cause a corresponding increase in pressure existing within the line 5 and the friction clutches 2 and 3. This situation is shown in FIG. 3 and represented by lines B–C in FIG. 4.

If the movement of the first and second pistons 8 and 9 is advanced further, until the second piston 9 comes into contact with the rearwardly projecting portion of the valve body 7, then the effective area of the valve body 7 is decreased by an amount corresponding to the sectional area of the second piston 9. Consequently, this decrease in the effective area becomes a new basis for the line pressure effected by the valve body 7. During this time, internal pressure within the first oil chamber 12 is sharply increased and regulated in conformity to the new effective area. Hence, the variation of oil pressure within the line 5 and the friction clutches 2 and 3 becomes discontinuous both in the rate of variation and the resulting pressure.

This oil pressure variation may be expressed by a formula, that is, during that state prior to the valve body 7 being contacted by the second piston 9, the oil pressure varies with the change in the deformation of the second piston spring according to the following relation:

$$Pbc = k\ S/A_1$$

wherein:

$A_1$ = sectional area of pressure regulating valve 7

$Pbc$ = pressure before contact between pressure regulating valve 7 and second piston 9 is made $S$ = amount of deformation of second spring $k$ = spring constant of second spring When, however, body 7 is contacted by piston 9, the pressure is defined by the following relation:

$$Pcd = k\ S/A_1 - A_2$$

wherein:

$A_2$ = sectional area of second piston 9

$Pcd$ = pressure after contact between said valve 7 and second piston 9 has been made The structural system which results after the decrease in the effective area of valve body 7 has been made is shown in FIG. 1 where, as will be seen, the second piston 9 continues to be in abutment with the valve body 7. The pattern of pressure variation during this period is represented by lines C–D in FIG. 4. Subsequent to the attainment of this structural configuration, the friction members reach the state wherein the resulting pressure has a value of $P_a$ whereupon the power is perfectly and smoothly transmitted.

As will be understood from the foregoing discussion, conventional modulating valves attained oil pressure variation patterns such as those shown by the broken or chain lines in FIG. 4, wherein the rate of variation of oil pressure was constant or continuous as shown by broken lines, and the force exerted upon the friction members was controlled only by a change in the rate of variation of pressure, as shown by the chain lines. However, according to the present invention, the rate of variation of pressure is not merely changed, but in addition, the pressure itself is changed, simultaneously and discontinuously so as to develop an oil pressure pattern best suited for accomplishing smooth and quick engagement of the friction members. In accomplishing engagement between the two friction members, it is desirable that the oil pressure variation take place slowly, not only within the early phase of engagement, but also in the latter period of engagement where the coefficient of friction changes radically when proceeding from kinetic friction to static friction. The modulating valve according to the present invention can attain such requirement in a most ideal manner, while in addition, realizing a reduced period of engagement.

Figure 5:
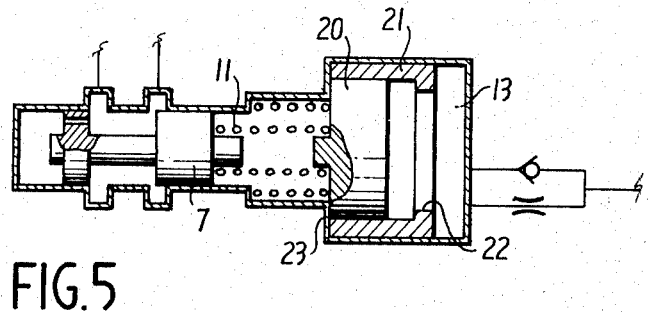
FIG. 5 is a partial view similar to that of FIG. 1, showing however another embodiment of the modulating valve; and, FIG. 6 is a partial view similar to that of FIG. 1 showing still another embodiment of the modulating valve.

Referring now to FIG. 5, there is shown another embodiment of the present invention wherein a first substantially cylindrical piston 20 is disposed within a second substantially annular piston 21. The first piston 20 is freely slidable relative to the second piston 21, but the second piston 21 is provided at its rear end with an annular flanged portion 22 which is designed to transmit movement of piston 21 to the first piston 20 within a certain pre-determined range of movement. It is also to be noted that the second piston 21 is defined in its scope of movement by a stopper means 23 mounted upon the valve casing. Owing to this arrangement, the force, and thus the pressure, transmitted to the valve body 7 by means of second spring 11 is varied discontinuously since the moving velocity of the first piston 20 remains discontinuous even if the flow rate of oil into the second oil chamber 13 is constant.

Figure 6:
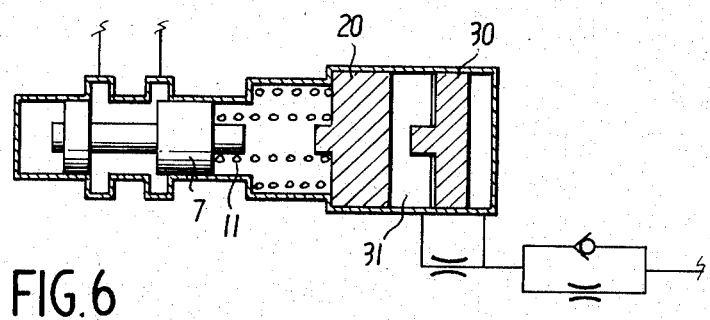

Similarly, in FIG. 6 there is shown still another embodiment of the present invention where, in order to render the velocity of the first piston 20 discontinuous, the second piston 30 is positioned so as to be in a tandem relation with the first piston 20, an axial boss 31 being secured to the front surface of piston 30 for abutting the rear surface of piston 20 so as to transmit the movement of piston 30 to piston 20. It will be noted that the pistons 20 and 30 are in effect disposed within two separate chambers, a separate fluid line connecting each chamber with main line 16, orifice 14, and check valve 15.

Obviously, many modifications and variations of the present invention are possible in light of the above teachings. It is to be understood therefore, that within the scope of the appended claims the present invention may be practiced otherwise than as specifically described herein.

What is claimed as new and desired to be secured by letters patent of the United States is:

1. A modulating valve for use in a friction clutch, capable of reducing the operating time of the clutch and also preventing the generation of any impulsive torque in the power transmitted by said clutch by discontinuously changing the rate of variation of fluid pressure used for pressing together the friction members of said clutch, comprising:

a valve body for variably adjusting said pressure for pressing together said friction members by means of a force applied to the rear surface thereof;

a plurality of pistons disposed rearwardly of said valve body and arranged to be slidable independently of each other by a fluid pressure introduced through an orifice from a circuit which retains said pressure for pressing together said friction members;

an elastic element disposed between one of said plurality of pistons and said valve body;

means for transmitting movement to said one of said plurality of pistons from the remaining pistons; and stopper means for restricting the sliding movement of said remaining pistons to a predetermined position.

2. A modulating valve as set forth in claim 1, wherein said remaining pistons are disposed so as to be movable within said one of said plurality of pistons, and wherein further the rear portion of said valve body is adapted to serve as said stopper means for said remaining pistons.

3. A modulating valve as set forth in claim 1, wherein said one of said plurality of pistons is disposed so as to be movable within said remaining pistons, and wherein said stopper means is mounted upon the valve casing.

4. A modulating valve as set forth in claim 1, wherein said one of said plurality of pistons and said remaining pistons are disposed within separate chambers respectively, and wherein said means for transmitting movement is disposed within one of said chambers.

* * * * *